(12) United States Patent
McCarty et al.

(10) Patent No.: US 6,382,253 B1
(45) Date of Patent: May 7, 2002

(54) FLUID PRESSURE REDUCTION DEVICE WITH INTEGRAL GUIDES

(75) Inventors: Michael Wildie McCarty; Mark Edward Byer, both of Marshalltown; Douglas Paul Gethmann, Gladbrook; James Leroy Gossett, State Center, all of IA (US)

(73) Assignee: Fisher Controls International, Inc., Clayton, MO (US)

( * ) Notice: Subject to any disclaimer, the term of this patent is extended or adjusted under 35 U.S.C. 154(b) by 0 days.

(21) Appl. No.: 09/782,143

(22) Filed: Feb. 13, 2001

(51) Int. Cl.[7] ............................................. F16K 11/04
(52) U.S. Cl. ............................................. 137/625.33
(58) Field of Search ..................... 137/625.3, 625.33

(56) References Cited

U.S. PATENT DOCUMENTS

| | | | |
|---|---|---|---|
| 5,409,351 A | * | 4/1995 | Geist ........................... 415/159 |
| 5,769,122 A | | 6/1998 | Baumann et al. |
| 6,026,859 A | | 2/2000 | Wears et al. |
| 6,095,196 A | | 8/2000 | McCarty et al. |
| 6,305,836 B1 | * | 10/2001 | Jarchau ................... 366/176.2 |

* cited by examiner

Primary Examiner—John Fox
(74) Attorney, Agent, or Firm—Marshall, Gerstein, & Borun.

(57) ABSTRACT

A fluid pressure reduction device for use with a fluid valve control member movable through the device. The pressure reduction device is formed of a plurality of stacked disks having an outer perimeter and an inner perimeter defined by a hollow center aligned along a longitudinal axis. The disks are formed in a cage assembly for receiving the fluid valve control member within the hollow center along the inner perimeter. The stacked disks include a plurality of longitudinal channels formed in the disk around the inner perimeter. Guide members formed of a metal harder or at least with greater wear resistant characteristics than the disks are provided in each of the longitudinal channels. The guide members are adapted to the inner perimeter for guiding the fluid valve control member in movements through the hollow center for reducing wear on the inner perimeter. It is preferred that the guide members comprise longitudinal rods inserted within each channel. Alternatively, longitudinal weld bead strips can be welded within the channels.

10 Claims, 3 Drawing Sheets

FLUID PRESSURE REDUCTION DEVICE WITH INTEGRAL GUIDES

This invention relates to fluid energy dissipation devices and in particular to a fluid pressure reduction device with a plurality of stacked disks securely maintained by mechanical fasteners in an assembled condition.

BACKGROUND OF THE INVENTION

In the control of fluid in industrial processes, such as oil and gas pipeline systems, chemical processes, etc., it is often necessary to reduce the pressure of a fluid. Adjustable flow restriction devices such as flow control valves and fluid regulators and other fixed fluid restriction devices such as diffusers, silencers, and other back pressure devices are utilized for this task. The purpose of the fluid control valve and/or other fluid restricting device in a given application may be to control flow rate or other process variables, but the restriction induces a pressure reduction inherently as a by-product of its flow control function.

Currently there is available an assembly of a plurality of stacked disks forming a fluid pressure reduction device fused together in a brazing process with additional mechanical fasteners added if desired to securely maintain the stacked disks assembled in a cage assembly. The cage assembly may be inserted into a fluid control valve to receive a valve control member, such as a plug, movable through the hollow center of the cage assembly.

As an example, in U.S. Pat. No. 6,026,859, assigned to the same assignee as herein, a plurality of stacked disks in a cage assembly include alternating flow disks and plenum disks with hollow centers. Respective cage ends are provided on opposite ends of the stacked disks. One of the cage ends includes a series of threaded bores and the opposite cage end includes a corresponding number of countersunk bores. A corresponding number of holes are drilled, cut or punched through each disk so that in the assembled stacked disks configuration, each disk hole can be aligned with a respective threaded bore in one cage end and with a respective countersunk bore in the opposite cage end. In the final assembly, the disks are maintained together by welding or brazing along the outer diameter of the assembled disks. Alternatively, a threaded bolt is inserted through the one cage end and through the disks to threadably engage the threaded bore in the opposite cage end.

In an improved embodiment, the stacked disks include two cage end members one of which has a series of tapered bores. A taper nut is inserted into and engageably contacts the corresponding tapered bore so that tightening of the bolt and nut mechanically secures the stacked disk-cage assembly.

In the usage of such devices, it has been found that the sliding motion of the plug through the inner cage undesirably wears down the inner diameter of the cage assembly and causes undesirable galling between the inside diameter cage surfaces and the plug outer surface.

It is therefore desired to provide wear resistance and galling protection for these devices in use.

SUMMARY OF THE INVENTION

In accordance with the principles of the present invention, there is provided a fluid pressure reduction device with guide members formed of a hard metal within the cage inner perimeter for guiding a valve control member, such as a plug movable through the cage inner perimeter for reducing wear and galling on the inner perimeter.

A fluid pressure reduction device according to the invention includes a plurality of stacked disks having an outer perimeter and an inner perimeter defined by a hollow center aligned along a longitudinal axis and forming a cage assembly of the stacked disks, A plurality of longitudinal channels are formed in the stacked disks around the inner perimeter. Guide members formed of a metal harder than the disks are provided in each longitudinal channel, with the dimensions of the guide member in the longitudinal channel cooperating so that the guide member substantially conforms to the dimensions of the cage inner perimeter.

The guide members form a guide at the cage inner perimeter for the valve control plug member moving through the cage assembly go an to reduce wear and galling by the valve control member on the inner perimeter of the cage assembly.

In a preferred embodiment of the invention, the guide members comprise longitudinal rods of a hard/wear resistant material, such as ULTIMET (R) Alloy or Alloy 6, the guide rod material being harder or at least having greater wear resistant characteristics than the disk material and sufficient to prevent galling and wear damage with its adjacent sliding member. The rods are adapted in the longitudinal channels so that the outer surface of the rods substantially match and conform to the inner perimeter of the cage assembly. Accordingly, the valve control plug outer surface will be guided by the outer surfaces of the guide rods as the plug moves through the cage inner perimeter.

Alternatively, longitudinal weld bead strips can be deposited within the longitudinal channels to comprise the guide members. The longitudinal weld bead strips can be formed of a hardfacing material, such as ULTIMET (R) Alloy or Alloy 6, and are located within the channels so that the exposed surface of the bead strips substantially matches and conforms to the inner perimeter of the cage assembly.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

DETAILED DESCRIPTION

Figure 1:
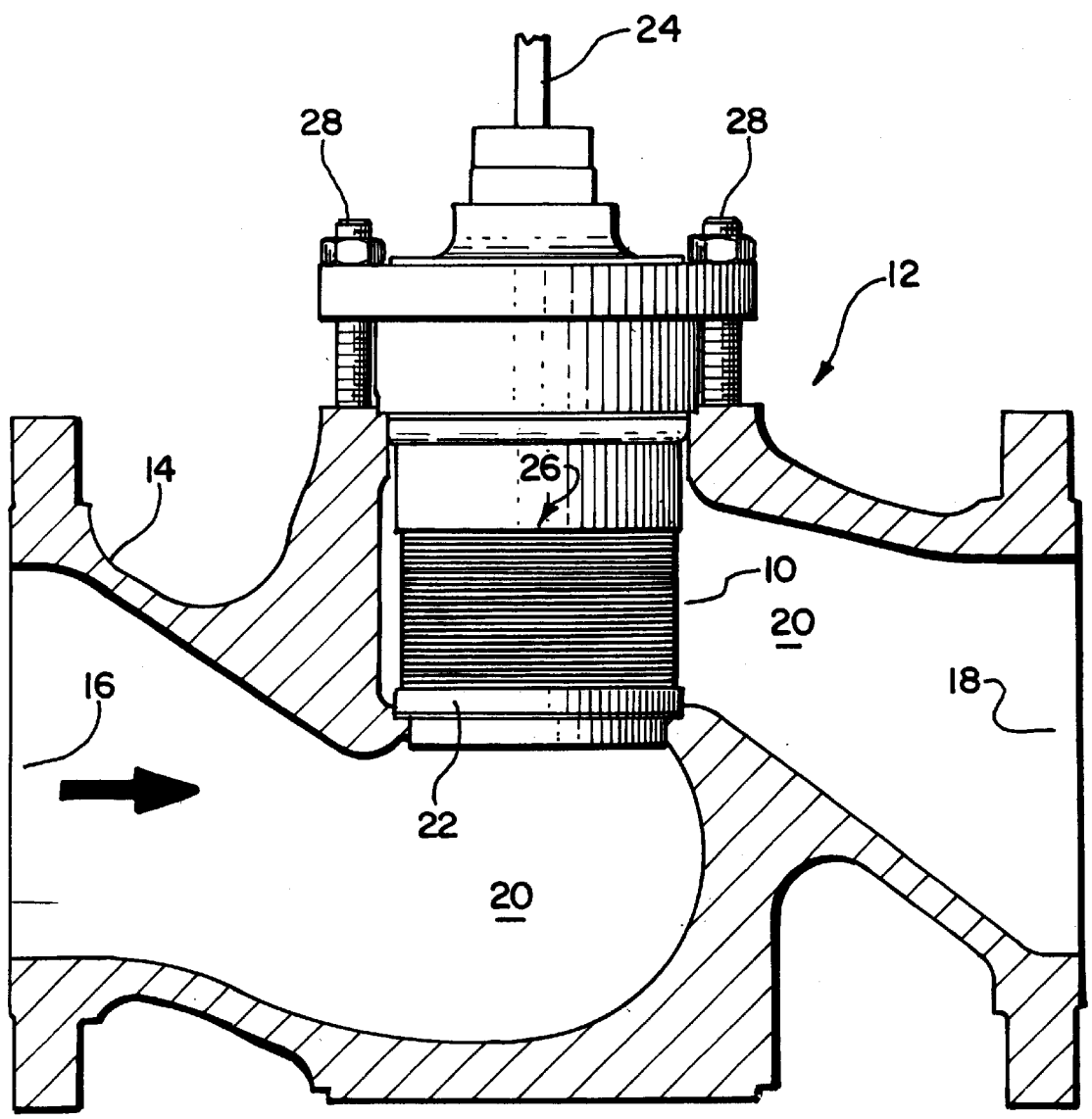
FIG. 1 is a cross-sectional view illustrating a fluid control valve containing a valve trim in the form of a stacked disk cage assembly forming a fluid pressure reduction device in accordance with the present invention.

Referring now to FIG. 1, there is illustrated a fluid pressure reduction device in accordance with the principles of the present invention in the form of a valve cage 10 having a plurality of stacked disks and mounted within a fluid control valve 12. Fluid control valve 12 includes a valve body 14 including a fluid inlet 16 and a fluid outlet 18, and a connecting passageway 20 through the valve body. The seat ring 22 is mounted within the valve body passageway 20 and cooperates with a valve operating member 24 having a plug slidably movable within the valve cage 10 to control fluid flow into the interior and through the exterior of the valve cage 10. The valve cage 10 is maintained within the valve by conventional mounting means such as a cage retainer 26 and mounting bolts 28 engaging the valve bonnet portion of a valve in a known manner.

The valve cage 10 includes a plurality of stacked disks 30 to provide flow attenuation of the fluid entering the hollow center of the stacked disks and exiting at the disk perimeter, or vice versa, in a known manner. Reference may be made for instance to U.S. Pat. Nos. 5,941,281 and 6,026,859, assigned to the same assignee as herein.

Figure 2:
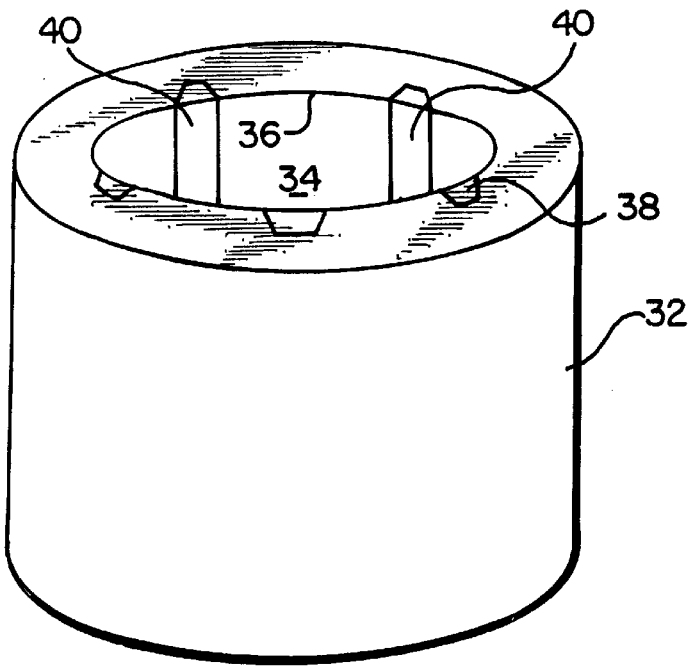
FIG. 2 is a perspective view of a stacked disk cage assembly with longitudinal weld bead strips provided within the inner perimeter of the cage assembly.
Figure 3:
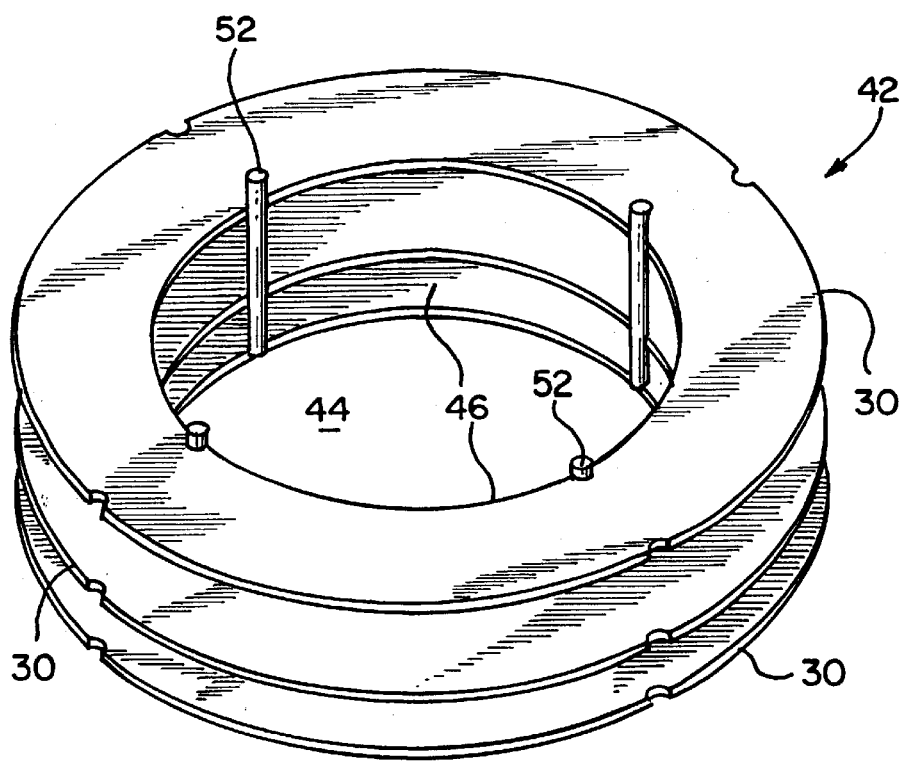
FIG. 3 is a perspective view illustrating a preferred embodiment of the present invention of a stacked disk cage assembly with longitudinal rods provided within the cage inner perimeter.
Figure 4:
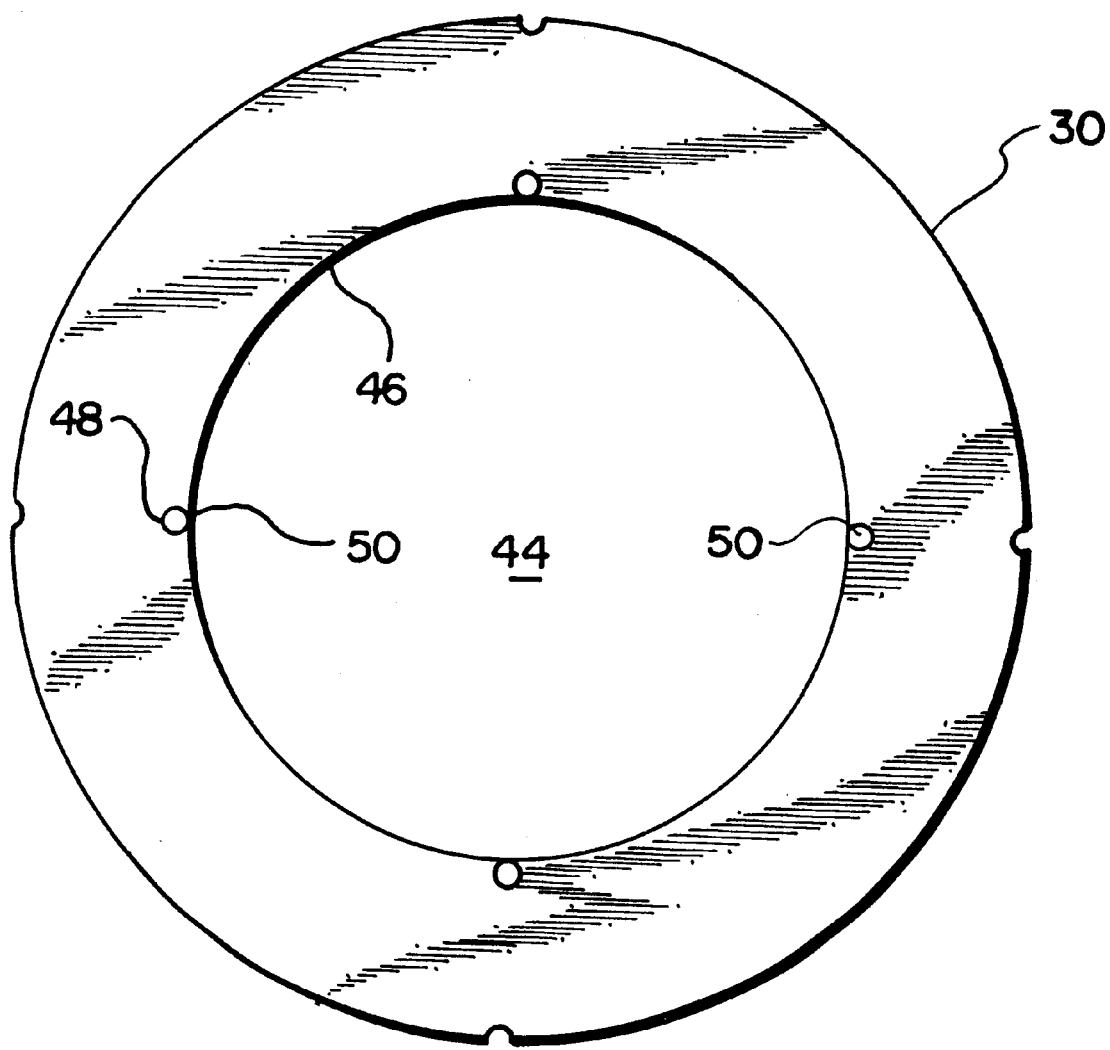
FIG. 4 is a plan view of the stacked disk cage assembly illustrating the longitudinal channels in the inner perimeter and longitudinal rods in each channel.

In accordance with the principles of the present invention, guide members formed of a metal harder or at least having greater wear resistant characteristics than the disks are provided in the inner perimeter of the hollow center of the stacked disks to guide the plug of the valve operating member 24 movable within the inner perimeter so as to reduce wear and galling on the inner perimeter of the stacked disks 10. FIG. 2 illustrates one embodiment of the present invention. FIGS. 3 and 4 illustrate the preferred embodiment of the present invention.

FIG. 2 illustrates schematically a stacked disk assembly 32 containing a plurality of disks and formed into a cage assembly with a hollow center 34 bounded by an inner perimeter 36 of the cage assembly. Each of the disks includes a groove 38 so that in the assembled cage there is provided a longitudinal channel formed of aligned grooves 38. Respective longitudinal weld bead strips 40 are deposited within each of the longitudinal channels with the exposed surface of these strips at the hollow interior 34 substantially matching and conforming to the inner perimeter 36. It is preferred that a hardfacing material, such as ULTIMET (R) Alloy or Alloy 6, be used to form the bead strips 40 to provide a guiding surface for the plug of the valve control member 24 movable within the cage interior 34 along the perimeter 36. The plurality of longitudinal weld bead strips 40 when formed of hardfacing material thereby tend to reduce wear and galling on the inner perimeter 36 of the softer disks.

FIGS. 3 and 4 illustrate the preferred embodiment of the present invention wherein a cage assembly 42 containing a plurality of stacked disks 30 with a hollow center 44 bounded by an inner perimeter 46. Each of the disks includes a groove 48 which is substantially closed except for a small opening 50 at the perimeter 46 as shown in FIG. 4. Accordingly, when the disks are assembled into the cage assembly 42, there is provided a plurality of longitudinal channels along the perimeter 46 each composed of the aligned grooves 48 with small openings 50 at the perimeter 46. The grooves 48 or pockets can be created by drilling, laser cutting, water jet cutting, etc. in a known manner.

Within each of the formed longitudinal channels (four channels) are illustrated in FIGS. 3 and 4, there is inserted a guide rod 52. It is preferred that the guide rods be formed of a hard/wear resistant material, such as ULTIMET (R) Alloy or Alloy 6, at least harder or having greater wear resistant characteristics than the disks and sufficient to prevent galling and wear damage with its adjacent sliding member. The guide rod 52 is sized with respect to the longitudinal channels formed by the aligned grooves or pockets 48 such that a small portion of the rods are exposed at the openings 50. In other words, the exposed portion of the guide rods at the openings 50 matches and substantially conforms to the inner perimeter 46. Accordingly, the rods 52 act to guide the plug of the valve operating member 24 as the plug moves in the hollow center 44 and adjacent the inner perimeter 46 so as to aid in preventing wear and galling on the inner perimeter of the cage assembly.

It is to be understood that the use of hard/wear resistant metal guide members in a cage assembly or a pressure reduction device according to the present invention can be applied to other cage member configurations to prevent galling and undesired wearing. As an example, hard/wear resistant metal guide members can be applied to a softer metal cage assembly in other fluid (gas or liquid) control applications where there is relative sliding movement between the cage and a control member.

Furthermore, hard/wear resistant guide members can be applied in other fluid valve components, such as valve actuator cylinders, stems, bushings, balls (rotary products), disks (as in butterfly valve disks), etc.

The foregoing detailed description has been given for clearness of understanding only, and no unnecessary limitations should be understood therefrom, as modifications will be obvious to those skilled in the art.

What is claimed is:

1. A fluid pressure reduction device for use with a fluid valve control member movable through said device, said device comprising:

a plurality of stacked disks having an outer perimeter and an inner perimeter defined by a hollow center aligned along a longitudinal axis and forming a cage assembly of said stacked disks for receiving said fluid valve control member within said hollow center and along said inner perimeter;

a plurality of longitudinal channels formed in said stacked disks around the inner perimeter; and guide members in each of said longitudinal channels formed of a metal having greater wear resistant characteristics than said disks and adapted to the inner perimeter for guiding the fluid valve control member in movements through said hollow center for reducing wear on said inner perimeter of said cage assembly.

2. A fluid pressure reduction device according to claim 1, wherein said guide members comprise longitudinal weld bead strips welded within said longitudinal channels.

3. A fluid pressure reduction device according to claim 2, wherein said longitudinal weld bead strips are formed of a hardfacing material.

4. A fluid pressure reduction device according to claim 3, wherein said longitudinal channels are substantially open to expose said weld bead strips at the inner perimeter.

5. A fluid pressure reduction device according to claim 1, wherein said guide members comprise longitudinal rods inserted within said longitudinal channels.

6. A fluid pressure reduction device according to claim 5, wherein said longitudinal rods are formed of a relatively hard/wear resistant metal, such as Alloy 6.

7. A fluid pressure reduction device according to claim 5, wherein said longitudinal channels are substantially closed and include an opening to expose a small portion of said longitudinal rods at the inner perimeter.

8. In a device including an external member and an internal member movable with respect to each other, said external member having an inter perimeter surface and said internal member having an outer perimeter surface, said inner and outer perimeter surfaces closely adjacent each other during said respective movement between the external member and the internal member, the improvement comprising:

a plurality of longitudinal channels formed in one of said inner and outer perimeter surfaces; and guide members in each of said longitudinal channels formed of a metal having greater wear resistant characteristics than said external and internal members and adapted to the inner and outer perimeters for guiding the respective movement of said external and internal members for reducing wear on said inner and outer perimeter surfaces.

9. The device according to claim 8, wherein one of the external and internal members is a cage assembly.

10. The device according to claim 9, wherein the plurality of longitudinal channels is formed in said cage assembly.

* * * * *